Feb. 6, 1945.  W. HUBER  2,369,051

WELDED TURBINE ROTOR

Filed June 3, 1943

INVENTOR.
WALTER HUBBER
BY
ATTORNEYS

Patented Feb. 6, 1945

2,369,051

UNITED STATES PATENT OFFICE 2,369,051

WELDED TURBINE ROTOR

Walter Huber, Winterthur, Switzerland, assignor to Sulzer Freres, Societe Anonyme, Winterthur, Switzerland Application June 3, 1943, Serial No. 489,479
In Switzerland July 10, 1942

3 Claims. (Cl. 253—39)

The invention relates to a turbo machine whose rotor is built up by welding separate disks together. The purpose of the invention is to hold the separate disks firmly in the proper positions relatively to each other before and during welding. The invention is characterised in that two adjoining disks are, before welding, supported on a centering ring by means of centering or welding edges, so that they are held in the proper central position, and that further a device is provided by means of which the disks are held at such a distance from each other that the necessary space for the weld metal remains free between the welding surfaces of the welding edges.

On a centering ring, two adjoining disks with welding edges can be supported before the welding operation, so that they are not only in the proper central position, but also are held at such a distance from each other that the necessary space for the weld metal remains free between the welding surfaces of the welding edges. Preferably such centering rings are provided with yielding supporting edges, against which the disks are supported in the axial direction before welding. In addition, the centering ring and the centering edges of the disks are to be formed and dimensioned in such a way that the yielding supporting edges are bent during the welding operation and the disks therefore lie on the centering ring after the welding operation.

In other executions, it is possible for instance to arrange on the disks not only a fixed, but also a yielding spacer, and these are to be designed and dimensioned in such a way that, in consequence of the deformation taking place in the yielding spacer when shrinking during the cooling after the welding, the disks rest on the fixed spacer. In connection with this, the fixed spacer can be provided with edges which ensure the disks being in the proper position relatively to each other. The spacers may also be arranged co-axially with the disks, being formed as circular rings.

The disks to be welded together may be provided with spaced edges concentric with the axis of rotation and on them at least one fixed and at least one yielding spacer are arranged. The disks to be welded together can be centered with respect to each other by means of centering edges arranged co-axially with the solids of revolution. Adjacent centering edges are preferably centered with respect to each other by means of a centering ring, the ring forming with the edges the groove for the welding together of the disks.

The yielding spacers can for instance consist of a soft material which is plastically deformed under the influence of the shrinkage forces.

Two examples of execution of the subject matter of the invention are diagrammatically illustrated on the drawing.

The disks 1 have on both sides a centering or welding edge 2 which is made in one piece with the disks, for instance by forging or by machining from a blank. Each two adjacent disks are supported by means of the centering edges on a centering ring 3.

Figure 1:
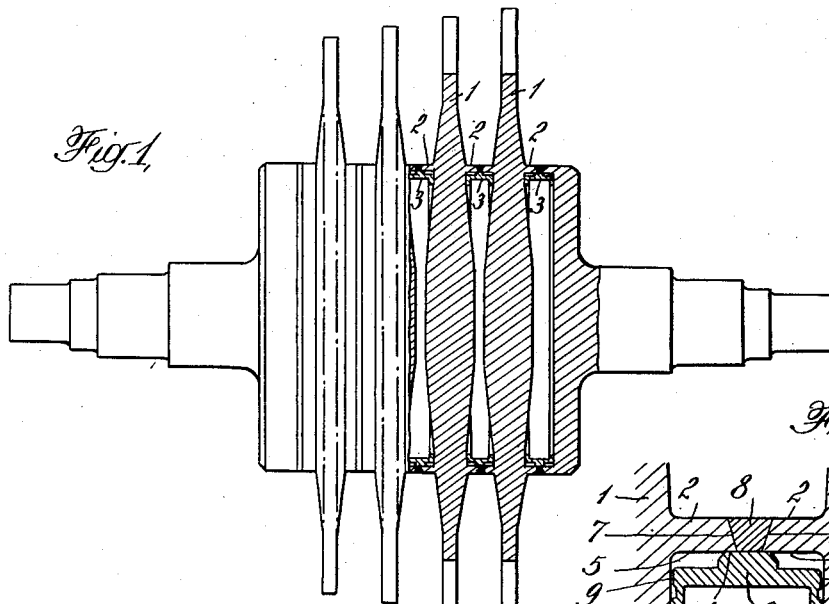
Fig. 1 is a longitudinal view, partly in section, of one embodiment of the invention.
Figure 2:
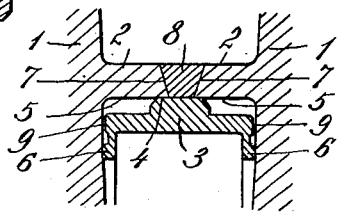
Fig. 2 is an enlarged fragmentary sectional view of a part of Fig. 1.

The inner cylindrical surfaces 5 of the welding edges 2 lie on the outer cylindrical surface 4 of the centering ring 3 (Fig. 2). In the axial direction, the disks bear against the yielding supporting edges 6 of the centering ring 3. The adjacent disks 1 are thereby held not only in the central position, but also at such a distance from each other that a groove 8 remains free to receive the weld metal between the welding surfaces 7 of the welding edges 2.

During the welding, the supporting edges 6 are bent inwards in such a way that the disks 1 rest on the fixed spacers 9 of the ring 3. After the welding, the body of the rotor can be heat-treated to free it from stresses.

Figure 3:
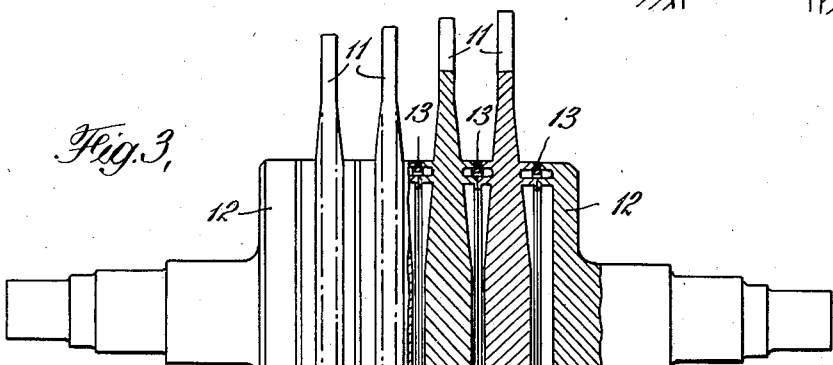
Fig. 3 is a longitudinal view, partly in section, of another embodiment of the invention.
Figure 4:
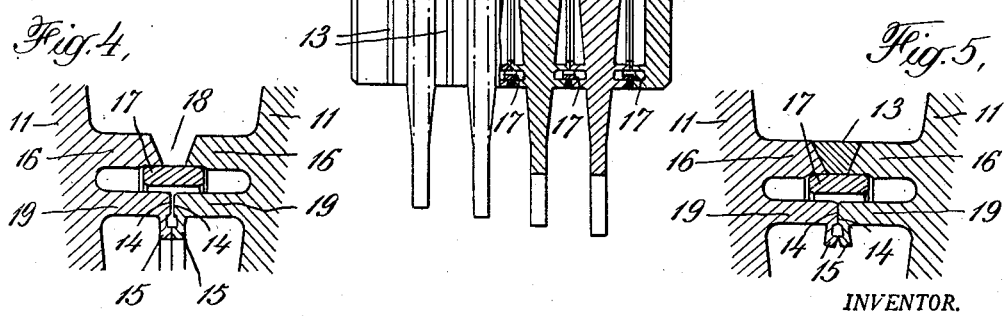
Fig. 4 is an enlarged fragmentary view of a part of Fig. 3 before welding.
Figure 5:
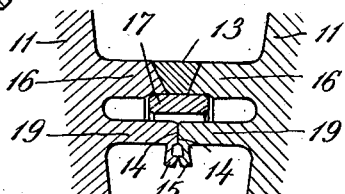
Fig. 5 is an enlarged fragmentary sectional view of the same parts as shown in Fig. 4 after welding.

The disks 11 (Figs. 3 to 5) and the shaft ends 12 are united to form a rotor by means of the welded joints 13. Each disk has a fixed spacer 14 (Figs. 4 and 5) and a yielding spacer 15, each fitted on a spacing edge 19. In addition to that, centering edges 16 are provided which form a groove 18 with the centering ring 17.

The fixed spacer 14 and the yielding spacer 15 are shaped and dimensioned so that, before the welding operation, the disks lie on the yielding spacer 15 (Fig. 4) and a space is left between the fixed spacers 14. When the weld metal is brought into the groove 18, not only the weld metal itself, but also the centering edges 16 are heated to a high temperature. When cooling takes place after the welding operation, the heated material contracts. The yielding spacers 15 (Fig. 5) are thereby deformed until the fixed spacers 14 rest on each other. In this manner the occurrence of inadmissible shrinkage stresses in the edges 16 and 19 and in the weld 13 is prevented.

The invention can be adapted for all possible types of rotors of turbo machinery, and therefore for instance for turbines, compressors, blowers, pumps, etc.

The spacers can be in the form of a continuous ring. For the yielding distance pieces, flexible parts or also plastic parts, for instance parts of soft iron or copper, may be used.

By means of the invention, not only is a neat weld of uniformly good quality obtained, but it also makes it possible, with simple means, to design and construct the welding edges on the disks in such a way that the effect of the heat during the welding operation remains uniform on both the disks. In this way the axial distance between the adjacent disks can be kept to an exact dimension. Finally, shrinkage stresses, which occur when ordinary welded joints cool down, are prevented.

I claim:

1. A rotor for a turbo machine which comprises a plurality of adjoining discs, each disc having an annular laterally projecting welding edge concentric with the rotor axis, a space between adjoining discs and inside the welding edges, means in the space having a fixed spacer and a yielding spacer for spacing the two discs, a space between the welding edges for the welding metal, and a centering ring inside the welding edges on which the discs are supported and centered before welding, said yielding spacers holding the discs in their spaced positions before welding and yielding as a result of welding to permit the fixed spacers to come into contact.

2. A rotor for a turbo machine which comprises a plurality of adjoining discs, each disc having an annular laterally projecting welding edge concentric with the rotor axis, a space between adjoining discs and inside the welding edges, a centering ring in the space having a fixed spacer and a yielding spacer, said yielding spacer being arranged to bear against the opposite sides of the adjoining discs prior to welding and to yield as a result of welding sufficiently to cause the fixed spacers to bear against said sides of the discs, an annular exterior bearing surface on the centering ring on which the inner surfaces of the welding edges rest, said welding edges being spaced apart to provide for the welding metal when the sides of the discs are in engagement with the yielding spacers.

3. A rotor for a turbo machine which comprises a plurality of adjoining discs, each disc having an annular laterally projecting welding edge concentric with the rotor axis, an annular and laterally disposed spacing member on each disc concentric with each welding edge and of smaller diameter than the welding edge, each spacing member having a fixed spacer and a yielding spacer which face each other when the discs are centered and in position for welding at which time the yielding spacers bear against each other, a space between the welding edges for the welding metal, and a centering ring between the welding edges and the spacing members for centering the discs prior to and during welding, said yielding spacers yielding sufficiently as a result of welding to permit the fixed spacers to bear against each other.

WALTER HUBER.